United States Patent
Cheng et al.

(10) Patent No.: US 11,308,086 B2
(45) Date of Patent: Apr. 19, 2022

(54) INCREASING DATABASE PERFORMANCE THROUGH QUERY AGGREGATION

(71) Applicant: Kyndryl, Inc., New York, NY (US)

(72) Inventors: Karen Cheng, Markham (CA); Marshall Todd Jarman, Stanford, KY (US); Charles Matula, Poughkeepsie, NY (US)

(73) Assignee: Kyndryl, Inc., New York, NY (US)

( * ) Notice: Subject to any disclaimer, the term of this patent is extended or adjusted under 35 U.S.C. 154(b) by 385 days.

(21) Appl. No.: 16/682,990

(22) Filed: Nov. 13, 2019

(65) Prior Publication Data

US 2020/0081890 A1 Mar. 12, 2020

Related U.S. Application Data (63) Continuation of application No. 15/432,003, filed on Feb. 14, 2017.

(51) Int. Cl.
  *G06F 16/00* (2019.01)
  *G06F 16/2453* (2019.01)
  *G06F 16/2455* (2019.01)

(52) U.S. Cl.
  CPC .... *G06F 16/24544* (2019.01); *G06F 16/2456* (2019.01)

(58) Field of Classification Search
  None
  See application file for complete search history.

(56) References Cited

U.S. PATENT DOCUMENTS

| | | | |
|---|---|---|---|
| 5,963,933 A | 10/1999 | Cheng et al. | |
| 6,721,730 B2 | 4/2004 | Kiernan et al. | |
| 8,290,936 B2 | 10/2012 | Day et al. | |
| 8,352,461 B2 | 1/2013 | Ahmed et al. | |
| 8,600,994 B1 | 12/2013 | Xu et al. | |
| 8,868,545 B2 | 10/2014 | Xu et al. | |
| 9,558,225 B2 * | 1/2017 | Skrzypczak | G06F 16/23 |
| 2015/0169661 A1 | 6/2015 | Skrzypczak et al. | |

(Continued)

OTHER PUBLICATIONS

List of IBM Patents or Patent Applications Treated as Related, Dec. 9, 2019, 2 pages.

(Continued)

*Primary Examiner* — Debbie M Le
(74) *Attorney, Agent, or Firm* — Heslin Rothenberg Farley & Mesiti P.C.; Ken Han, Esq.

(57) ABSTRACT

A method, computer program product, and system includes a processor(s) executing a new instruction in place of a left outer join instruction to generate a data set, where the left outer join instruction includes at least two tables and an indication of a column in each the tables to join on. Executing the new instruction includes the processor(s) creating a temporary table including all columns of the at least two tables, where values in fields of the temporary table are null values, executing an inner join instruction, the inner join instruction includes the indication of the column in each of the at least two tables to join on, to create a preliminary results set, and generating the data set, wherein the generating includes the processor(s) overlaying the preliminary results set on the temporary table to update a portion of the null values with values from the preliminary results set.

20 Claims, 8 Drawing Sheets

(56) References Cited

U.S. PATENT DOCUMENTS

2017/0031989 A1     2/2017   Barbas et al.
2017/0193036 A1*   7/2017   Yueh ..................... G06F 3/0482
2018/0232418 A1     8/2018   Cheng et al.

OTHER PUBLICATIONS

Anonymously; "Method and System for Full Outer Join Elimination in the Presence of Multiple Distinct Aggregation"; http://ip.com/IPCOM/000212340D; Nov. 7, 2011.

IBM; "Algorithms for Generating Outerjoin SQL Queries for Criollo Mapping"; http://ip.com/IPCOM/000125760D; Jun. 16, 2005.

IBM; "A Graphical User Interface for Specifying Complex Nested Join Conditions in a SQL Query"; http://ip.com/IPCOM/000131066D; Nov. 7, 2005.

Mell et al., "The NIST Definition of Cloud Computing", National Institute of Standards and Technology, U.S. Dept. of Commerce, NIST Special Publ. 800-145, Sep. 2011, 7 pages.

* cited by examiner

| REGION | SP | REV_M01 | REV_M02 | REV_M03 | REV_M04 | REV_M05 |
|---|---|---|---|---|---|---|
| NA | CITI | NULL | NULL | NULL | NULL | NULL |
| NA | HP | NULL | NULL | NULL | NULL | NULL |
| EMEA | CITI | NULL | NULL | NULL | NULL | NULL |
| EMEA | HP | NULL | NULL | NULL | NULL | NULL |
| AP | CITI | NULL | NULL | NULL | NULL | NULL |
| AP | HP | NULL | NULL | NULL | NULL | NULL |

| REV_M06 | REV_M07 | REV_M08 | REV_M09 | REV_M10 | REV_M11 | REV_M12 | REV_M13 |
|---|---|---|---|---|---|---|---|
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |
| NULL | NULL | NULL | NULL | NULL | NULL | NULL | NULL |

FIG. 3

| REGION | SP | REV_M01 | REV_M02 | REV_M03 | REV_M04 | REV_M05 |
|--------|------|---------|---------|---------|---------|---------|
| NA | CITI | 23 | 20 | 18 | 24 | 19 |
| NA | HP | 45 | 19 | 22 | 28 | 27 |
| AP | CITI | 18 | 18 | 24 | 19 | 18 |

| REV_M06 | REV_M07 | REV_M08 | REV_M09 | REV_M10 | REV_M11 | REV_M12 | REV_M13 |
|---------|---------|---------|---------|---------|---------|---------|---------|
| 18 | 19 | 22 | 28 | 27 | 0 | 16 | 12 |
| 19 | 22 | 28 | 27 | 19 | 22 | 28 | 27 |
| 19 | 22 | 28 | 27 | 0 | 16 | 12 | 21 |

FIG. 4

| REGION | SP | REV_M01 | REV_M02 | REV_M03 | REV_M04 | REV_M05 | REV_M06 | REV_M07 | REV_M08 | REV_M09 | REV_M10 | REV_M11 | REV_M12 | REV_M13 |
|---|---|---|---|---|---|---|---|---|---|---|---|---|---|---|
| NA | CITI | 23 | 20 | 18 | 24 | 19 | 18 | 19 | 22 | 28 | 27 | 0 | 16 | 12 |
| NA | HP | 45 | 19 | 22 | 28 | 27 | 19 | 22 | 28 | 27 | 19 | 22 | 28 | 27 |
| EMEA | CITI | NULL | NULL | NULL | NULL | NULL | NULL | NULL | NULL | NULL | NULL | NULL | NULL | NULL |
| EMEA | HP | NULL | NULL | NULL | NULL | NULL | NULL | NULL | NULL | NULL | NULL | NULL | NULL | NULL |
| AP | CITI | 18 | 18 | 24 | 19 | 18 | 19 | 22 | 28 | 27 | 0 | 16 | 12 | 21 |
| AP | HP | NULL | NULL | NULL | NULL | NULL | NULL | NULL | NULL | NULL | NULL | NULL | NULL | NULL |

1  record(s) selected real 9m14.628s
```

620

```
         116                              - -  +0.00000000000000E+000
  0      115                              - -  +0.00000000000000E+000
  0      114                              - -  +0.00000000000000E+000
  0      113                              - -  +0.00000000000000E+000
  0      112                              - -  +0.00000000000000E+000
  0      111                              - -  +0.00000000000000E+000
  0      110                              - -  +0.00000000000000E+000
  0      109                              - -  +0.00000000000000E+000
  0      108                              - -  +0.00000000000000E+000
  0      107                              - -  +0.00000000000000E+000
  0      106                              - -  +0.00000000000000E+000
  0      105                              - -  +0.00000000000000E+000
  0      104  +3.83456397030937E+004      0   +1.41549098100000E+009
36914

1  record(s) selected real 0m0.790s
```

INCREASING DATABASE PERFORMANCE THROUGH QUERY AGGREGATION

BACKGROUND

In Structured Query Language (SQL), a join clause is a command that combines columns from one or more tables in a relational database, creating a set that can be saved as a table or used as it is. A JOIN is a means for combining columns from one (self-table) or more tables by using values common to each. There are different types of joins in SQL, one kind is a left outer join, which can be contrasted with an inner join. The result of a left outer join (or simply left join) for two tables, e.g., A and B, contains all rows of the "left" table (i.e., A), even if the join-condition does not find any matching row in the "right" table (i.e., B). This means that if the ON clause (which contains the field to match on) matches 0 (zero) rows in B (for a given row in A), the join will still return a row in the result (for that row), but with NULL in each column from B. A left outer join returns all the values from an inner join (an inner join selects all rows from both participating tables as long as there is a match between the columns), plus all values in the left table that do not match to the right table, including rows with NULL (empty) values in the link column.

SUMMARY

Shortcomings of the prior art are overcome and additional advantages are provided through the provision of a method for improving the efficiency of an operation in a relational database. The method includes, for instance: executing, by one or more processors, a new instruction in place of a left outer join instruction to generate a data set for future processing, wherein the left outer join instruction includes at least two tables and an indication of a column in each of the at least two tables to join on, and wherein executing the outer join generates the data set, the executing the new instruction comprising: creating, by the one or more processors, a temporary table comprising all columns of the at least two tables, wherein values in fields of the temporary table, for each column, are null values; executing, by the one or more processors, an inner join instruction, on the at least two tables, the inner join instruction comprising the indication of the column in each of the at least two tables to join on, to create a preliminary results set; and generating, by the one or more processors, the data set, wherein the generating comprises overlaying, by the one or more processor, the preliminary results set on the temporary table to update a portion of the null values with values from the preliminary results set.

Shortcomings of the prior art are overcome and additional advantages are provided through the provision of a computer program product for improving the efficiency of an operation in a relational database. The computer program product comprises a storage medium readable by a processing circuit and storing instructions for execution by the processing circuit for performing a method. The method includes, for instance: executing, by one or more processors, a new instruction in place of a left outer join instruction to generate a data set for future processing, wherein the left outer join instruction includes at least two tables and an indication of a column in each of the at least two tables to join on, and wherein executing the outer join generates the data set, the executing the new instruction comprising: creating, by the one or more processors, a temporary table comprising all columns of the at least two tables, wherein values in fields of the temporary table, for each column, are null values; executing, by the one or more processors, an inner join instruction, on the at least two tables, the inner join instruction comprising the indication of the column in each of the at least two tables to join on, to create a preliminary results set; and generating, by the one or more processors, the data set, wherein the generating comprises overlaying, by the one or more processor, the preliminary results set on the temporary table to update a portion of the null values with values from the preliminary results set.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
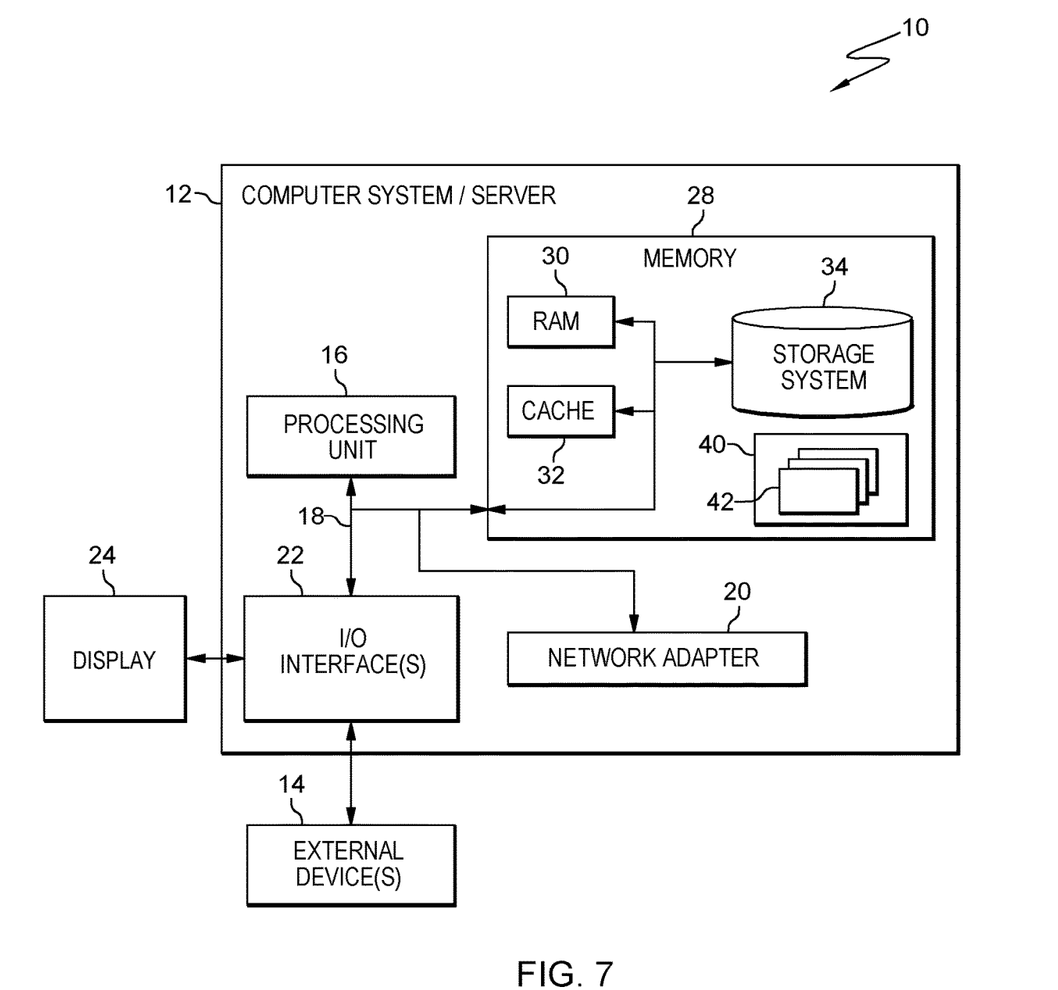
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include computer system, a computer-implemented method, and a computer program product that include one or more programs that increase database performance efficiencies by modifying special-purpose programming language (e.g., structured query language, SQL), which manages data in a relational database (e.g., SQL server). Embodiments of the present invention are inextricably ties to computing and increase the efficiency of computing operations, such as query execution, by re-structuring certain queries in a relational database. Certain embodiments of the present invention achieve a processing time that is hundreds of times faster than executing the original instruction without the modification. Specifically, rather than perform a left outer join to capture data from a relational database, in embodiments of the present invention, one or more programs: 1) generate a temporary table with NULL values for all possible combinations of a group (e.g., dimension columns) to ensure all possible NULLs are returned, using the programming language; 2) generate a data table using only inner joins, the data table including all valid combinations that have data; 3) overlay the data table on top of the temporary table with NULL values to generate an updated table populated from the temporary table and updated by the data table; and 4) select from the combined table. Advantages of certain aspects of embodiments of the present invention is that the described operation of the one or more programs enable the computer system to gain performance efficiencies by eliminating: use of a left outer join query, a database management system check for NULL conditions on an outer joined table, and producing rows with NULL values.

In embodiments of the present invention, one or more programs in embodiments of the present invention increase database performance by rewriting SQL to eliminate left outer joins in a query that aggregates results. In this manner, the one or more programs replace left outer joins with inner joins, by executing a method that includes four processes. In existing applications, SQL outer joins are implemented to perform a join of two tables, returning all rows from the left-most table with matching rows in the right-most table, and placing NULL values in the right side, where there is no match. However, while left outer joins are a commonly used approach, they consume significant time and resources on databases, creating a performance impact. One or more programs in embodiments of the present invention produce the same results as a left outer join without having to use this inefficient tool.

Figure 3:
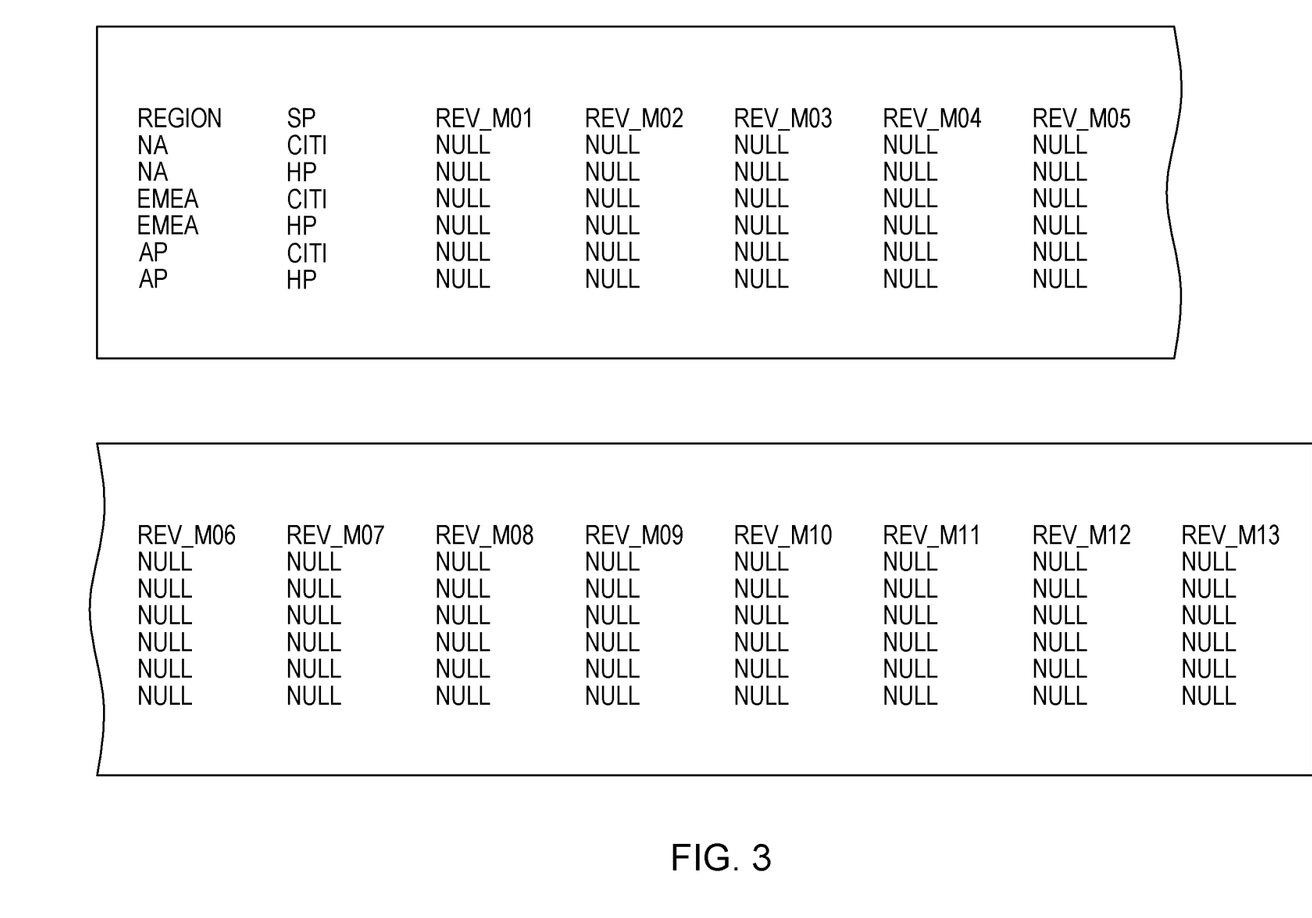
FIG. 3 is an illustration of certain aspects of embodiments of the present invention.
Figure 4:
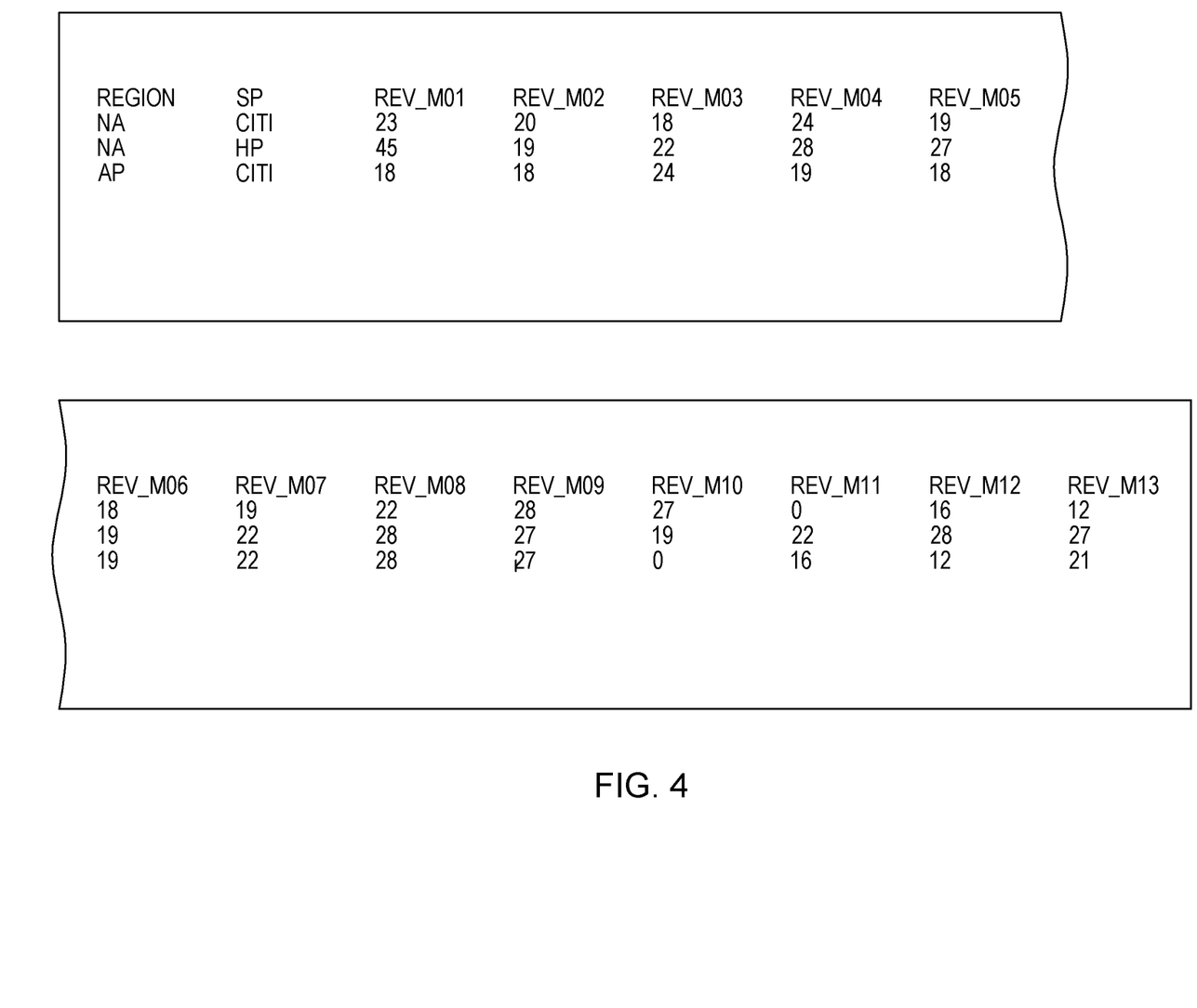
FIG. 4 is an illustration of certain aspects of embodiments of the present invention.
Figure 5:
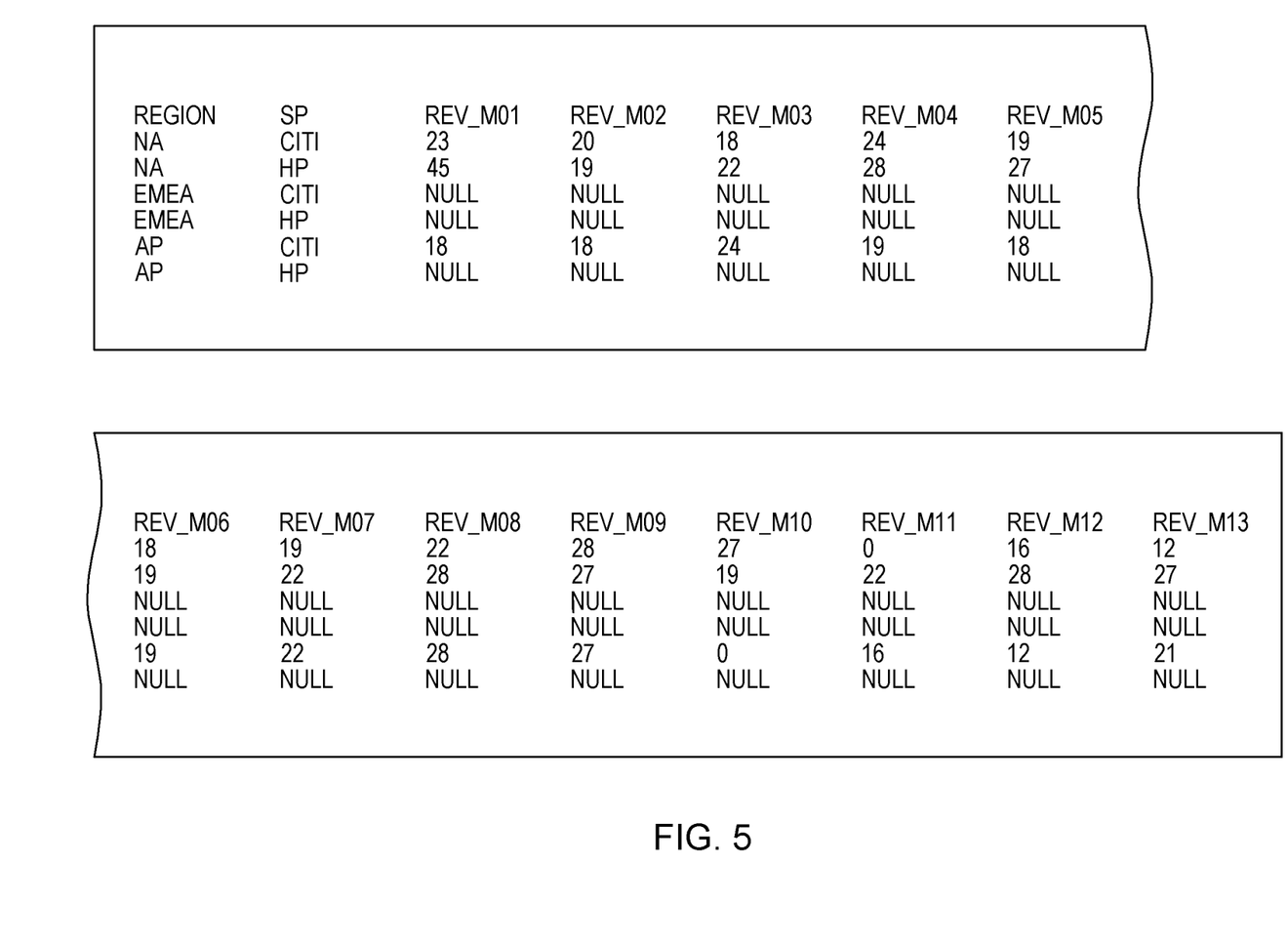
FIG. 5 is an illustration of certain aspects of embodiments of the present invention.

Tables 1-4 are included in this specification in order to illustrate various concepts in SQL and querying in relational databases. Aspects unique to embodiments of the present invention, including but not limited to, generating a temporary table with NULL values for all possible combinations of a group (e.g., dimension columns) to ensure all possible NULLs are returned and overlaying the data from a results set on top of the temporary table with NULL values to generate an updated table populated from the temporary table and updated by the data table, are not illustrated in these figures. Rather, certain aspects of embodiments of the present invention are illustrated in FIGS. 3-5, which are discussed herein after Tables 1-4.

As is demonstrated in the example utilizing Table 1-Table 3 below, executing a left outer join in a relational database introduces a number of inefficiencies both because the left outer join query itself is processing intensive and when one or more programs execute a left outer join, a relational database management system (RDBMS) checks for NULL conditions on the outer joined table. Thus, the combination of the RDBMS checks and the production of rows with NULL values is work intensive.

Embodiments of the present invention address these issues in a manner that takes advantage of existing functionalities of an RBDMS and therefore, does not further complicate the relational databases into which it is implemented by requiring customizations. For example, embodiments of the present invention address inefficiencies in left outer joins by exploiting data aggregation or group by clauses. As understood by one of skill in the art, in database management an aggregate function is a function where the values of multiple rows are grouped together as input on certain criteria to form a single value of more significant meaning or measurement such as a set, a bag or a list. Common aggregate functions include: AVG( ) (returns arithmetic mean/average), COUNT( ) (returns an enumeration of values), SUM( ) (returns total sum of a numeric column), MIN( ) (returns the smallest value of a selected column.), and MAX( ) (returns the smallest value of a selected column). In SQL, a GROUP BY clause works on the rows returned by a query by summarizing identical rows into a single/distinct group and returns a single row with the summary for each group, by using appropriate aggregate functions in the SELECT list, like COUNT( ) SUM( ), MIN( ), MAX( ), AVG( ), etc.

Another feature of an RBDMS that embodiments of the present invention utilize to address inefficiencies in left out joins is the creation of temporary tables. As will be discussed in greater detail herein, embodiments of the present invention create a temporary table of NULL values for every combination in the aggregation set. As will be demonstrated herein, creating this table enables one or more programs to produce the same results set as a left outer join, but without the system inefficiencies inherent in the command.

As discussed above, a join clause in SQL combines columns from one or more tables in a relational database, creating a set that can be saved as a table or used as it is. In a join involving, for example, two tables, an inner join returns all rows from both participating tables as long as there is a match between the columns. Meanwhile, an outer join returns a results that contains all rows of the first (i.e., left) table even if the join-condition does not find any matching row in the second (i.e., right) table. As an example, two tables to be joined are provided below, Table 1 and Table 2.

Table 1 is an Employee Table, with the columns LName (last name) and DptmntID (department identification number). There are six employees listed in Table 1, these employees are associated with three different department identification numbers.

TABLE 1

| LName | DptmntID |
|---|---|
| Elias | 21 |
| Davis | 86 |
| Miller | 21 |
| Williams | 86 |
| Simms | 42 |
| Blume | 21 |

Table 2 is a Department Table. The table includes the columns Dprtmnt (department name) and DprtmntID (department identification number). As seen in Table 2, there are four departments in Table 2, each with corresponding identification numbers.

TABLE 2

| Dprtmntname | DprtmntID |
|---|---|
| Legal | 21 |
| Engineering | 86 |
| Marketing | 42 |
| Sales | 47 |

A SQL statement can be part of one or more programs executed by at least one processing circuit to create a set of data that associates employees with the departments that they work in by name, instead of number. This data set is generated when one or more programs executed a join of the tables in the relational database, in this case, Table 1 and Table 2. When an inner join in executed by one or more programs, as mentioned above, the resultant data set will include all rows from both participating tables as long as there is a match between the columns. Table 3 below represents a resultant data set from an inner join of Table 1 and Table 2.

TABLE 3

| Employee.LName | Employee.Dptmnt | Department.Dprtmntname | Department.DprtentID |
|---|---|---|---|
| Elias | 21 | Legal | 21 |
| Davis | 86 | Engineering | 86 |
| Miller | 21 | Legal | 21 |
| Williams | 86 | Engineering | 86 |
| Blume | 42 | Marketing | 42 |

Below is an example of an SQL statement including an inner join that will generate the results set that is Table 3:

SELECT employee.LName, employee.DprtmntID, department.Dprtmntname
FROM employee
INNER JOIN department ON
employee.DprtmntID=department.DprtmntID Table 4 is an example of a data set that is the result of a left outer join of Table 1 and Table 2. Unlike in Table 3, in Table 4, the results contains all rows Table 1, even if the join-condition does not find any matching row in Table 2. In this example, employee Simms is listed in the results of the left outer join (Table 4), but not in the results of the inner join (Table 3).

TABLE 4

| Employee.LName | Employee.Dprtmnt | Department.Dprtmntname | Department.DprtmntID |
|---|---|---|---|
| Elias | 21 | Legal | 21 |
| Davis | 86 | Engineering | 86 |
| Miller | 21 | Legal | 21 |
| Williams | 86 | Engineering | 86 |
| Simms | NULL | NULL | NULL |
| Blume | 42 | Marketing | 42 |

Figure 1:
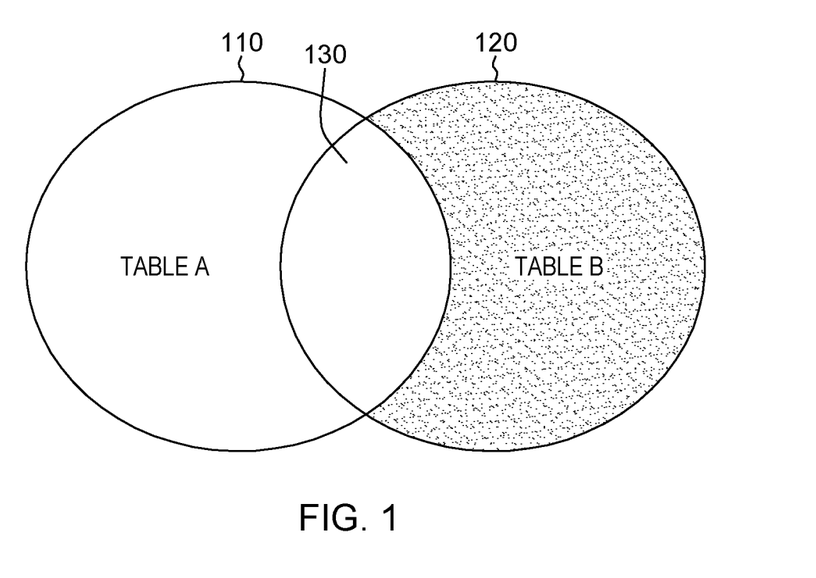
FIG. 1 is an illustration of certain concepts relevant to embodiments of the present invention.

Below is an example of an SQL statement that when executed by at least one processing circuit in a relational database containing Table 1 and Table 2 will produce the resultant data of Table 4:

SELECT*
FROM employee
LEFT OUTER JOIN department ON employee.DprtmntID=department.DprtmntID;

FIG. 1 further illustrates, as a yen diagram, the results set of a left outer join in SQL. FIG. 1 shows the results of a left outer join between a left table, Table A 110, and a right table, Table B 120. An intersection 130 between the tables is also show in FIG. 1. As demonstrated above a left outer join performs a join starting with the first (left-most) table, Table A 110, and then any matching records 130, of the second (right-most) table, Table B 120.

Executing a left outer join in a relational database introduces a number of inefficiencies. For example, the left outer join query itself is processing intensive. When one or more programs execute a left outer join, a relational database management system (RDBMS) checks for NULL conditions on the outer joined table. An example of an RDBMS (e.g., an SQL RDBMS) that can be queried more efficiently as a result of implementing aspects of embodiment of the present invention is DB2, which is a database product from International Business Machines. It is a RDBMS designed to store, analyze and retrieve data efficiently and is extended with the support of Object-Oriented features and non-relational structures with XML. Based on executing a left outer join, the one or more programs produce rows with NULL values. The combination of the RDBMS checks and the production of rows with NULL values is work intensive. However, generating the comprehensive data set produced by a left outer join is desirable in many applications, so in existing systems, database efficiencies are sacrificed for the ability to generate resultant data set of a left outer join. Embodiments of the present invention produce the same comprehensive data set as left outer joins without these inefficiencies.

Figure 2:
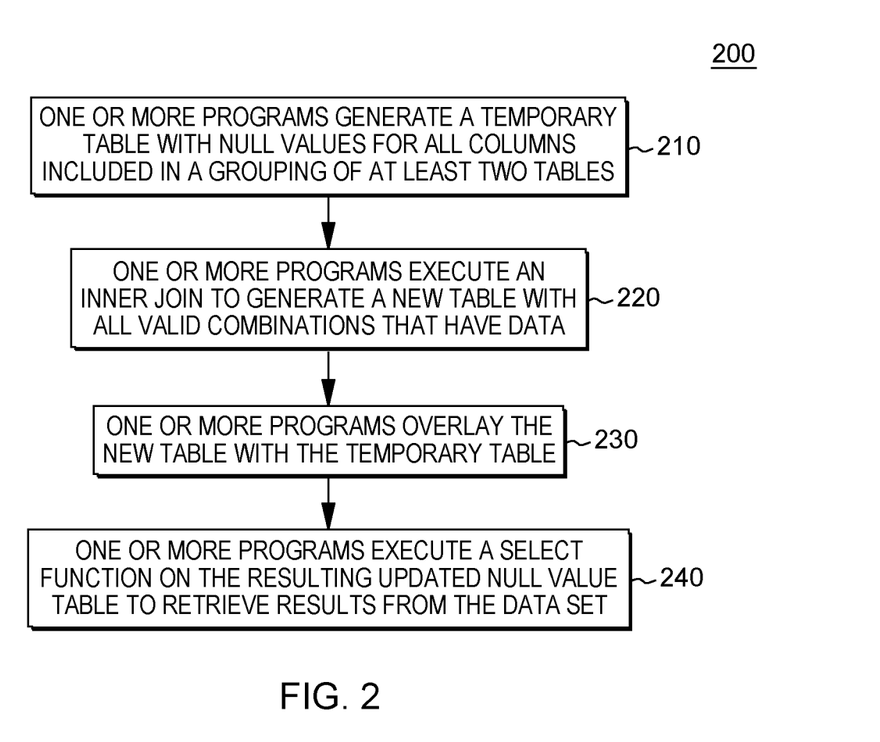
FIG. 2 is a workflow illustrating certain aspects of embodiments of the present invention.

FIG. 2 is a workflow 200 illustrating aspects of embodiments of the present invention. In some embodiments of the present invention, rather than executing a left outer join, in order to aggregate data in a results set identical to one produced by an outer join, one or more programs executed by at least one processing circuit generate a temporary table with NULL values for all columns included in a grouping of at least two tables (210). FIG. 3 is an example of such a temporary table, RPT_TABLE. This table is the results of group by of REGION and SP, which can be produced by executing the following SQL statement: CALC REV group by Region, SP. In an embodiment of the present invention, as illustrated in FIG. 3, the temporary table produced, RPT TABLE includes NULL values in the following columns:

REV_M01, REV_M02, REV_M0, REV_M04, REV_M05, REV_M06, REV_M07, REV_M08, REV_M09, REV_M10, REV_M11, REV_M12, REV_M13.

Returning to FIG. 2, in some embodiments of the present invention, the one or more programs execute an inner join to generate a new table with all valid combinations that have data (220). FIG. 4 is an example of a table that is the result of this inner join, the results for the group by function with data (i.e., SQL CALC REV group by Region, SP). Note that while the REGION and SP columns each had six fields in the temporary tables of NULL values, this new table only include three fields in each of these columns.

Referring back to FIG. 2, the one or more programs overlay the new table (e.g., FIG. 4), with the temporary table (e.g., FIG. 3) (230) (e.g., overlay results onto NULL value table, return as a left outer join result). The one or more programs execute a select function on the resulting updated NULL value table to retrieve results from the data set (240). An example of the data set produced by overlaying the result of the inner join on the table with the temporary table with the NULL values is depicted in FIG. 5. This result is the same result set that would have been the result of performing a left outer join on the same data. As seen in FIG. 5, the results include a comprehensive data set with NULL values where there is no correlation, the feature that distinguishes the results set of an outer join from the results set on an inner join.

Figure 6:
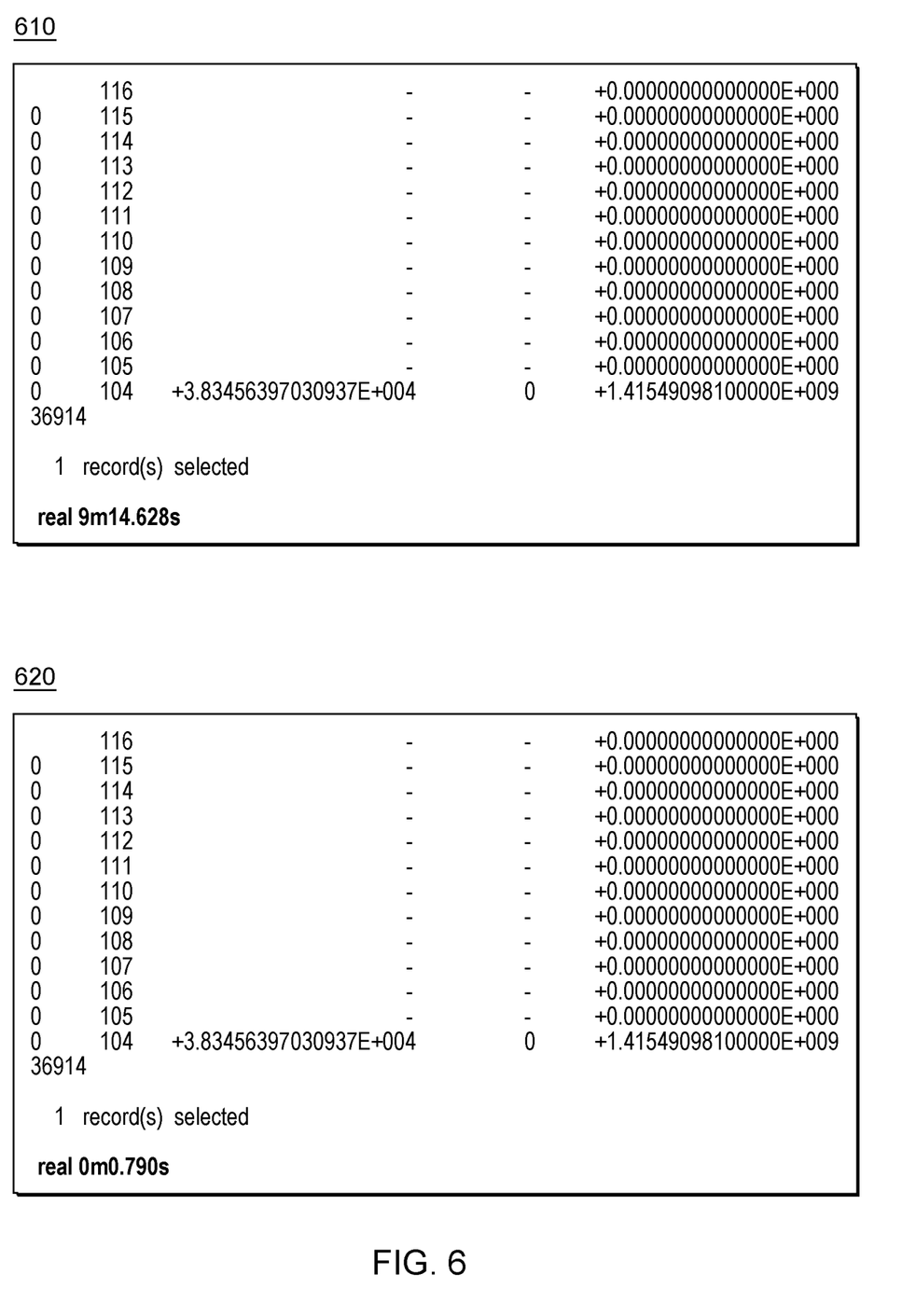
FIG. 6 is a comparison of certain advantages of embodiments of the present invention to an existing method.

FIG. 6 demonstrates the gained efficiency of utilizing aspects of embodiments of the present invention to pull a result set equivalent to that pulled in a left out join, in a relational database. As aforementioned, one or more programs in embodiments of the present invention can fetch the results set hundreds of times faster than utilizing a left outer join. FIG. 6 is a printout of a test run on the sample data in FIGS. 3-5. The upper portion 610 of FIG. 6 shows results from a traditional selection method, where one method is selected from a data set created with a left outer join in 9m14.628s. The lower portion 620 illustrates results when one or more programs in an embodiments of the present invention makes the same selection. The lower portion 620 shows a completed selection in 0m0.790s. This is an eight hundred (800) time speed improvement.

Embodiments of the present invention include a computer-implemented method, a computer program product, and a system that improve the operational efficiency of a relational database. In an embodiment of the present invention, one or more programs execute a new instruction in place of a left outer join instruction to generate a data set for future processing, where the left outer join instruction includes at least two tables and an indication of a column in each of the at least two tables to join on, and where executing the outer join generates the data set, the executing the new instruction comprising. Executing the new instruction includes the one or more programs creating a temporary table including all columns of the at least two tables, where values in fields of the temporary table, for each column, are null values. The one or more programs executed an inner join instruction, on the at least two tables, the inner join instruction includes the indication of the column in each of the at least two tables to join on, to create a preliminary results set. The one or more programs generate the data set, which include overlaying the preliminary results set on the temporary table to update a portion of the null values with values from the preliminary results set. In an embodiment of the present invention, the left outer join instruction and the new instruction include structured query language. In an embodiment of the present invention, the one or more programs generate the new instruction from the left outer join instruction.

In an embodiment of the present invention, the one or more programs select values from the data set. Selecting values may include the one or more programs executing a subsequent structured language query to select a portion of data from the data set.

In an embodiment of the present invention, one or more programs monitor query execution in a relational database, identify the left outer join in a database instruction before execution of the instruction, and halt execution of the instruction. The one or more programs may also identify an instruction subsequent to the database instruction, where the subsequent instruction includes a select statement, selecting from the data set and execute the subsequent instruction. In an embodiment of the present invention, the one or more programs monitor query execution by utilizing a monitor is a relational database management system of the relational database.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, one or more computing device utilized to revise a query as well as the database server hosting the relational database in which queries as executed, can be understood as cloud computing node 10 (FIG. 7) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
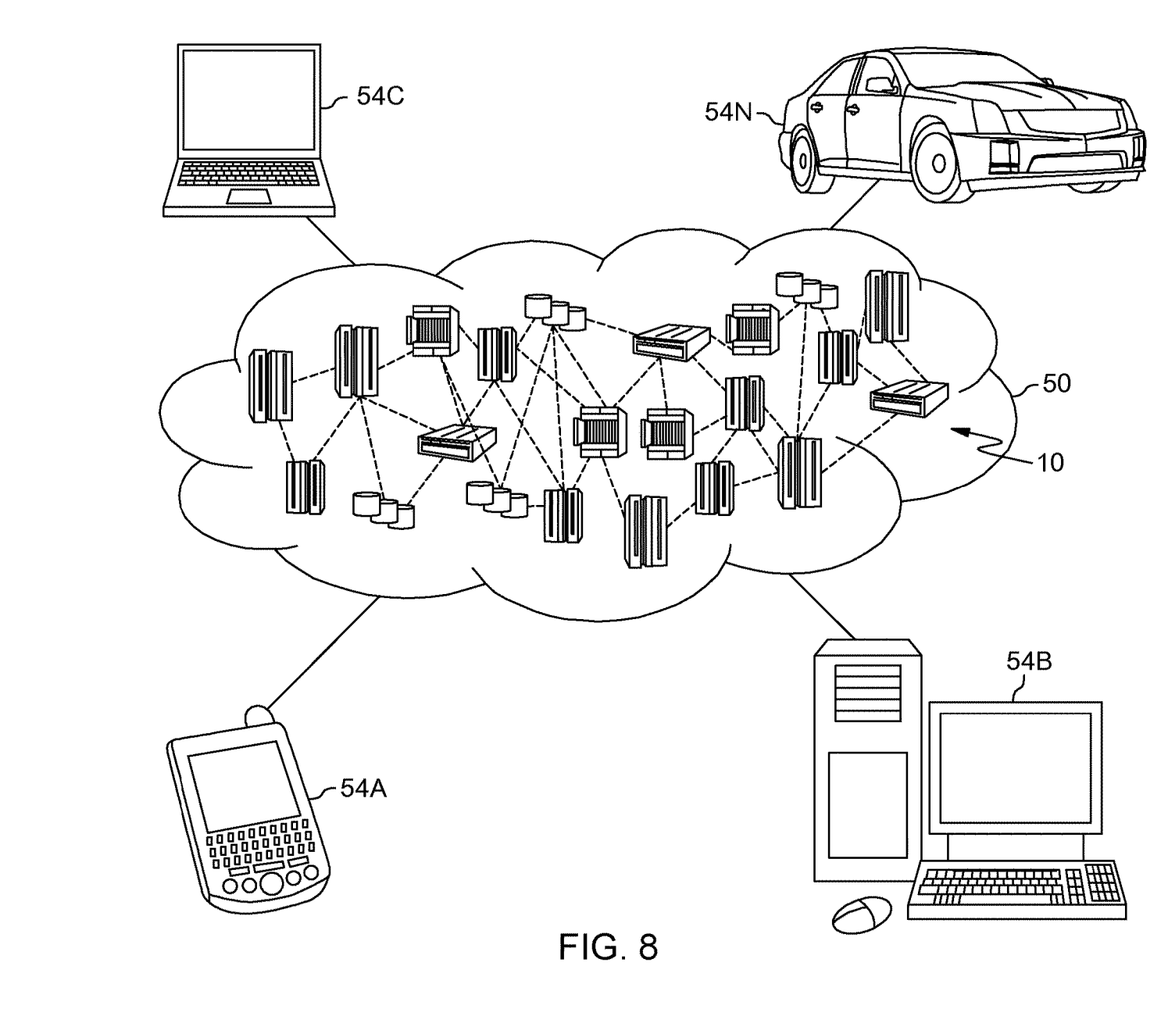
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
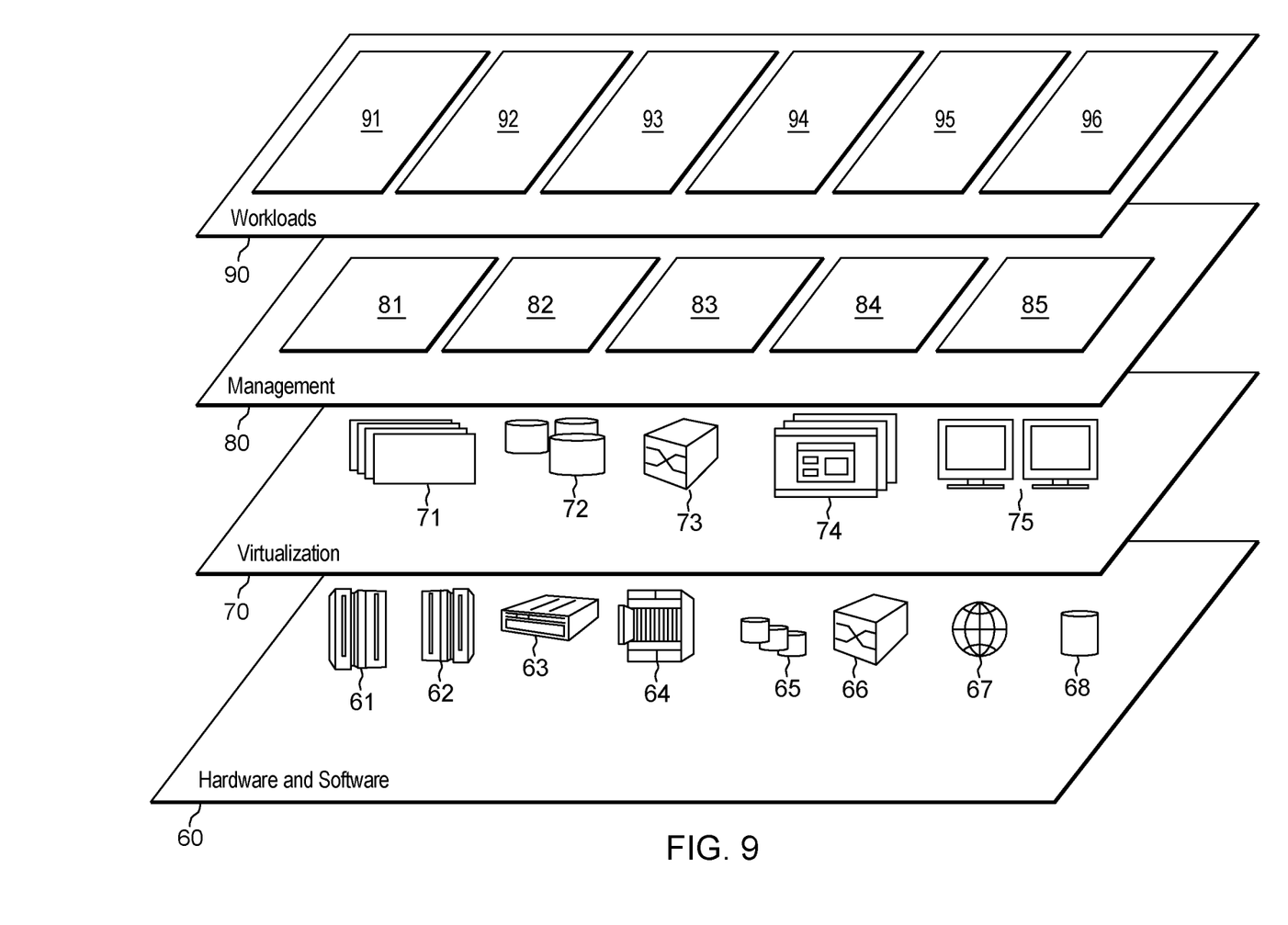
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and aggregating data utilizing querying techniques 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   monitoring, by one or more processors, query execution in a relational database;
   identifying, by the one or more processors, a left outer join in a database instruction before execution of the instruction by the one or more processors;
   halting, based on the identifying, by the one or more processors, execution of the database instruction;
   executing, by the one or more processors, a new instruction in place of the halted left outer join instruction to generate the data set for future processing, wherein the left outer join instruction includes at least two tables and an indication of a column in each of the at least two tables to join on, and wherein executing the outer join generates the data set, the executing the new instruction comprising:
    creating, by the one or more processors, a temporary table comprising all columns of the at least two tables, wherein values in fields of the temporary table, for each column, are null values;
    executing, by the one or more processors, an inner join instruction, on the at least two tables, the inner join instruction comprising the indication of the column in each of the at least two tables to join on, to create a preliminary results set; and
    generating, by the one or more processors, the data set, wherein the generating comprises overlaying, by the one or more processor, the preliminary results set on the temporary table to update a portion of the null values with values from the preliminary results set.

2. The computer-implemented method of claim 1, further comprising:
    selecting, by the one or more processors, values from the data set.

3. The computer-implemented method of claim 2, wherein the selecting comprises:
    executing, by the one or more processors, a subsequent structured language query to select a portion of data from the data set.

4. The computer-implemented method of claim 1, further comprising:
    identifying, by the one or more processors, an instruction subsequent to the database instruction, wherein the subsequent instruction comprises a select statement, selecting from the data set.

5. The computer-implemented method of claim 4, further comprising:
    executing, by the one or more processors, the subsequent instruction.

6. The computer-implemented method of claim 1, wherein the monitoring comprises utilizing a monitor is a relational database management system of the relational database.

7. The computer-implemented method of claim 1, wherein the left outer join instruction and the new instruction comprise structured query language.

8. The computer-implemented method of claim 1, wherein the executing further comprises:
    generating, by the one or more processors, from the left outer join instruction, the new instruction.

9. A computer program product comprising:
    a computer readable storage medium readable by one or more processors and storing instructions for execution by the one or more processors for performing a method comprising:
        monitoring, by the one or more processors, query execution in a relational database;
        identifying, by the one or more processors, a left outer join in a database instruction before execution of the instruction by the one or more processors;
        halting, based on the identifying, by the one or more processors, execution of the database instruction;
        executing, by the one or more processors, a new instruction in place of the halted left outer join instruction to generate the data set for future processing, wherein the left outer join instruction includes at least two tables and an indication of a column in each of the at least two tables to join on, and wherein executing the outer join generates the data set, the executing the new instruction comprising:
            creating, by the one or more processors, a temporary table comprising all columns of the at least two tables, wherein values in fields of the temporary table, for each column, are null values;
            executing, by the one or more processors, an inner join instruction, on the at least two tables, the inner join instruction comprising the indication of the column in each of the at least two tables to join on, to create a preliminary results set; and
            generating, by the one or more processors, the data set, wherein the generating comprises overlaying, by the one or more processor, the preliminary results set on the temporary table to update a portion of the null values with values from the preliminary results set.

10. The computer program product of claim 9, the method further comprising:
    selecting, by the one or more processors, values from the data set.

11. The computer program product of claim 10, wherein the selecting comprises:
    executing, by the one or more processors, a subsequent structured language query to select a portion of data from the data set.

12. The computer program product of claim 9, the method further comprising:
    identifying, by the one or more processors, an instruction subsequent to the database instruction, wherein the subsequent instruction comprises a select statement, selecting from the data set.

13. The computer program product of claim 12, the method further comprising:
    executing, by the one or more processors, the subsequent instruction.

14. The computer program product of claim 9, wherein the monitoring comprises utilizing a monitor is a relational database management system of the relational database.

15. The computer program product of claim 9, wherein the left outer join instruction and the new instruction comprise structured query language.

16. The computer program product of claim 9, wherein the executing further comprises:
    generating, by the one or more processors, from the left outer join instruction, the new instruction.

17. A system comprising:
    a memory;
    one or more processors in communication with the memory; and
    program instructions executable by the one or more processors via the memory to perform a method, the method comprising:
        monitoring, by the one or more processors, query execution in a relational database;
        identifying, by the one or more processors, a left outer join in a database instruction before execution of the instruction by the one or more processors;
        halting, based on the identifying, by the one or more processors, execution of the database instruction;
        executing, by the one or more processors, a new instruction in place of the halted left outer join instruction to generate the data set for future processing, wherein the left outer join instruction includes at least two tables and an indication of a column in each of the at least two tables to join on, and wherein executing the outer join generates the data set, the executing the new instruction comprising:

creating, by the one or more processors, a temporary table comprising all columns of the at least two tables, wherein values in fields of the temporary table, for each column, are null values;

executing, by the one or more processors, an inner join instruction, on the at least two tables, the inner join instruction comprising the indication of the column in each of the at least two tables to join on, to create a preliminary results set; and generating, by the one or more processors, the data set, wherein the generating comprises overlaying, by the one or more processor, the preliminary results set on the temporary table to update a portion of the null values with values from the preliminary results set.

18. The system of claim 17, the method further comprising:
   selecting, by the one or more processors, values from the data set.

19. The system of claim 18, wherein the selecting comprises:
   executing, by the one or more processors, a subsequent structured language query to select a portion of data from the data set.

20. The system of claim 17, the method further comprising:
   identifying, by the one or more processors, an instruction subsequent to the database instruction, wherein the subsequent instruction comprises a select statement, selecting from the data set; and
   executing, by the one or more processors, the subsequent instruction.

* * * * *